(12) United States Patent
Choe

(10) Patent No.: US 9,465,245 B2
(45) Date of Patent: Oct. 11, 2016

(54) TOUCH PANEL

(71) Applicant: LG INNOTEK CO., LTD., Seoul (KR)

(72) Inventor: Min Su Choe, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 202 days.

(21) Appl. No.: 14/136,422

(22) Filed: Dec. 20, 2013

(65) Prior Publication Data

US 2014/0176829 A1  Jun. 26, 2014

(30) Foreign Application Priority Data

Dec. 21, 2012  (KR) .................. 10-2012-0150796

(51) Int. Cl.
*G02F 1/1333* (2006.01)
*G06F 3/044* (2006.01)

(52) U.S. Cl.
CPC ........... *G02F 1/13338* (2013.01); *G06F 3/044* (2013.01)

(58) Field of Classification Search
CPC ..... G06F 3/041; G06F 3/044; G02F 1/13338
USPC ........................................ 345/173
See application file for complete search history.

(56) References Cited

U.S. PATENT DOCUMENTS

| 8,709,265 B2 | 4/2014 | Misaki | |
| 2008/0164076 A1* | 7/2008 | Orsley | G06F 3/03543 178/18.01 |
| 2008/0238706 A1* | 10/2008 | Kenwright | G06F 3/044 340/686.6 |
| 2009/0073135 A1 | 3/2009 | Lin et al. | |
| 2009/0091551 A1* | 4/2009 | Hotelling | G06F 3/0416 345/174 |
| 2009/0194344 A1* | 8/2009 | Harley | G06F 3/044 178/18.06 |
| 2010/0001973 A1 | 1/2010 | Hotelling et al. | |
| 2011/0096016 A1* | 4/2011 | Yilmaz | G06F 3/044 345/174 |

(Continued)

FOREIGN PATENT DOCUMENTS

| DE | 202011052512 U1 | 2/2012 |
| EP | 2141573 A2 | 1/2010 |
| TW | 201314543 A | 4/2013 |

(Continued)

OTHER PUBLICATIONS

Office Action dated Jul. 14, 2015 in Taiwanese Application No. 102146042.

(Continued)

*Primary Examiner* — Viet Pham
(74) *Attorney, Agent, or Firm* — Saliwanchik, Lloyd & Eisenschenk

(57) ABSTRACT

A touch panel includes: a cover window in which an active area and an unactive area are defined; a sensing electrode in the active area; a wire electrode connected to the sensing electrode; and a bonding part connected to the wire electrode, wherein the sensing electrode includes a first sensing electrode in the active area; and a second sensing electrode aligned on a same plane with the first sensing electrode in the active area, the first sensing electrode is coupled with the second sensing electrode, and a coupling area between the first sensing electrode and the second sensing electrode is increased as the first sensing electrode and the second sensing electrode are located away from the bonding part.

15 Claims, 5 Drawing Sheets

(56) References Cited

U.S. PATENT DOCUMENTS

| | | | |
|---|---|---|---|
| 2012/0044187 A1* | 2/2012 | Polishchuk | G06F 3/044 345/174 |
| 2012/0327012 A1* | 12/2012 | Hoch | G06F 3/044 345/174 |
| 2013/0038563 A1 | 2/2013 | Yilmaz et al. | |
| 2013/0154991 A1* | 6/2013 | Yilmaz | G06F 3/044 345/174 |
| 2013/0155002 A1* | 6/2013 | Yang | G06F 3/044 345/174 |
| 2014/0152615 A1 | 6/2014 | Chang et al. | |
| 2014/0166464 A1 | 6/2014 | Fix et al. | |

FOREIGN PATENT DOCUMENTS

| | | |
|---|---|---|
| TW | 201423531 A | 6/2014 |
| WO | WO-2013013905 A1 | 1/2013 |

OTHER PUBLICATIONS

European Search Report dated Jul. 17, 2015 in European Application No. 13197314.1.

* cited by examiner

TOUCH PANEL

CROSS-REFERENCE TO RELATED APPLICATION

This application claims the benefit under 35 U.S.C. §119 of Korean Patent Application No. 10-2012-0150796, filed Dec. 21, 2012, which is hereby incorporated by reference in its entirety.

BACKGROUND

The embodiment relates to a touch panel.

A touch panel including an input unit (pointing device) has been extensively used in displays of electronic devices such as personal digital assistants (PDA), a notebook computer, office automation (OA) device, a medical device, or an automobile navigation system. For example, a capacitive touch panel, a resistive touch panel, an electromagnetic induction touch panel, and an optical touch panel are generally known in the art. Recently, the resistive touch panel has been extensively used.

A front surface of the touch panel is generally divided into an active area to which a touch command of a user can be input and an unactive area to which the touch command of the user cannot be input. A bezel is included in the unactive area.

The bezel is provided therein with a wire electrode to connect a sensing electrode. Generally, the bezels may be formed at upper, lower, left, and right sides of a touch panel, respectively. Since a use region of a user is limited at the front surface of the touch panel due to the bezels formed at left and right sides of the touch panel, the user may feel inconvenience when using the touch panel.

Accordingly, a touch panel having no bezels at the left and right sides of the touch panel has been developed. However, if the bezels formed at the left and right sides of the touch panel are removed, wire electrodes formed at the left and right bezels must be formed at upper and lower sides of the touch panels, respectively. In this case, the wire electrode must be formed by using a material the same as that of the sensing electrode, for example, indium tin oxide (ITO).

However, if the left and right bezels are removed and the wire electrode is formed by an ITO material, a current value of the sensing electrode becomes gradually reduced as the sensing electrode is located away from the wire electrode or a bonding part provided at a top end or a bottom end of the touch panel.

That is, when the wire electrode is formed by using a transparent conductive material such as the ITO material, a sensitivity of the sensing electrode is not uniform over the whole area of the touch panel because a resistance value of the wire electrode is increased as compared with a resistance value of a metal wire electrode.

Therefore, a touch panel having a uniform sensitivity is required when bezels at left and right sides of the touch panels are removed.

BRIEF SUMMARY

The embodiment provides a touch panel with a uniform sensitivity in which left and right bezels are removed.

According to the embodiment, there is provided a touch panel including: a cover window in which an active area and an unactive area are defined; a sensing electrode in the active area; a wire electrode connected to the sensing electrode; and a bonding part connected to the wire electrode, wherein the sensing electrode includes a first sensing electrode in the active area; and a second sensing electrode aligned on a same plane with the first sensing electrode in the active area, the first sensing electrode is coupled with the second sensing electrode, and a coupling area between the first sensing electrode and the second sensing electrode is increased as the first sensing electrode and the second sensing electrode are located away from the bonding part.

The touch panel according to the embodiment may represent improved uniformity of touch sensitivity on an active area.

Particularly, when the touch panel according to the embodiment is a touch panel having no left and right bezels where a wire electrode is formed at a top end or a bottom end of the touch panel, the high resistance, which is caused by a wire electrode including a conductive material and formed in an active area, can be compensated.

That is, according to the touch panel of the embodiment, since patterns are formed such that a coupling region between a first sensing electrode pattern and a second electrode pattern is lengthened as the patterns are located away from a bonding part, at which the wire electrode is connected with a printed circuit board, that is, a top end or a bottom end of a cover window, a current generated from the first sensing electrode may be increased as the first sensing electrode is located away from the bonding part.

Accordingly, the pattern is formed such that the current value of the sensing electrode can be increased at a region where the wire electrode is lengthened, thereby compensating for the influence of the wire resistance.

Therefore, since the touch panel according to the embodiment may uniformly maintain the current value of the sensing electrode located on the active area, uniformity of touch sensitivity on the touch panel can be improved.

DETAILED DESCRIPTION

Figure 1:
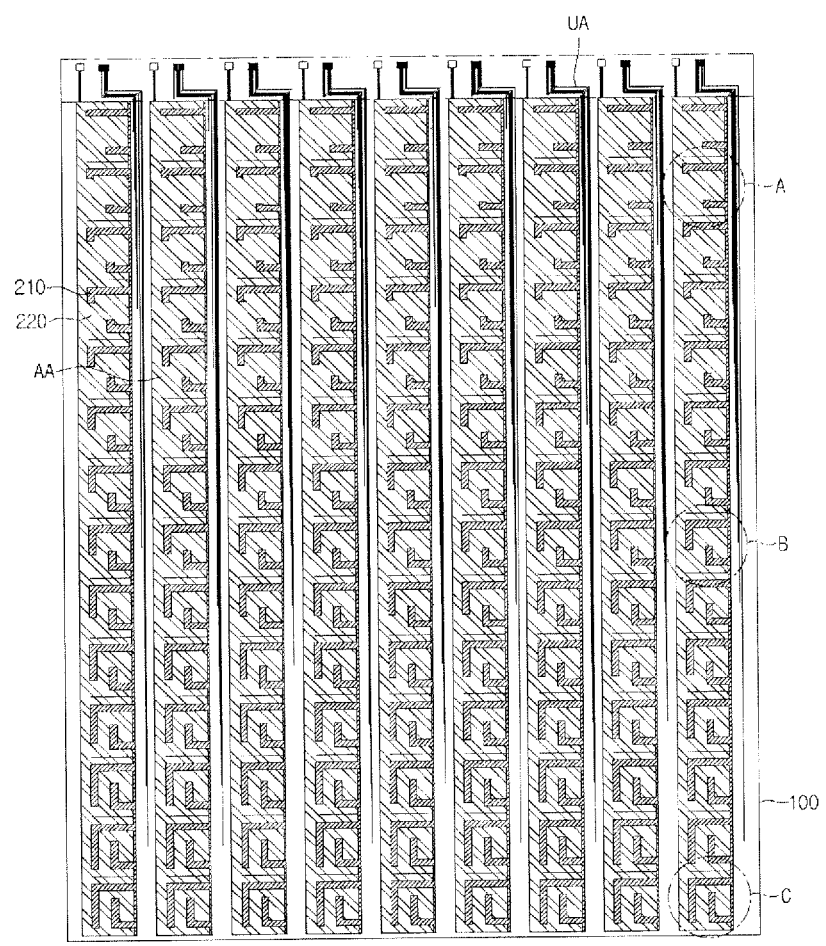
FIG. 1 is a view illustrating a touch panel according to an embodiment.

In the following description of the embodiments, it will be understood that, when a layer (film), a region, a pattern or a structure is referred to as being "on" or "under" a cover window, another layer (film), region, pad or patterns, it can be "directly" or "indirectly" on the other layer (film), region, pattern or structure, or one or more intervening layers may also be present. Such a position of each layer described with reference to the drawings.

The thickness and size of each layer (film), region, pattern or structure shown in the drawings may be exaggerated, omitted or schematically drawn for the purpose of convenience or clarity. In addition, the size of each layer (film), region, pattern or structure does not utterly reflect an actual size.

Hereinafter, the touch panel according to the embodiment will be described in detail with reference to FIGS. 1 to 6.

FIG. 1 is a view illustrating a touch panel according to an embodiment. Referring to FIG. 1, in the touch panel according to the embodiment, a sensing electrode and a wire electrode connected to the sensing electrode are aligned in an active area AA of a cover window 100.

In detail, the cover window 100 may include glass or plastic. For example, the cover window 100 may include strengthened glass, half-strengthened glass, sodalime glass, strengthened plastic, or flexible plastic.

The cover window 100 may include an active area AA and an unactive area UA. The active area AA signifies an area through which a touch instruction of a user may be input. In addition, the unactive area UA has the concept opposite to that of the active area AA, that is, the unactive area UA is not activated even if a user touches the unactive area UA, so the unactive area UA signifies an area through which any touch instructions cannot be input.

A wire electrode may be aligned in the unactive area UA. That is, the wire electrode drawn toward the unactive area UA from the active area AA may be provided. A bonding part to connect the wire electrode with a printed circuit board may be disposed on the unactive area UA. That is, the unactive area UA may overlap with the bonding part.

The sensing electrode may include a first sensing electrode 210 and a second sensing electrode 220. The first sensing electrode 210 and the second sensing electrode 220 may extend in the same direction.

Particularly, in the touch panel according to the embodiment, the wire electrode 200 may be disposed at a region except for a lateral region of a cover window. That is, since the wire electrode 200 is aligned on an active area AA of the cover window 100 and is drawn toward a top end of the cover window 100, the unactive area UA formed at left and right regions of the cover window 100 may be removed. Accordingly, in the touch panel according to the embodiment, bezels formed at left and right sides of the cover window 100 may be removed. Thus, an active area on which a touch is sensed may be maximized.

Further, since a separate printing layer may not be necessary on the left and right unactive areas of the cover window 100, process efficiency can be improved.

Figure 4:
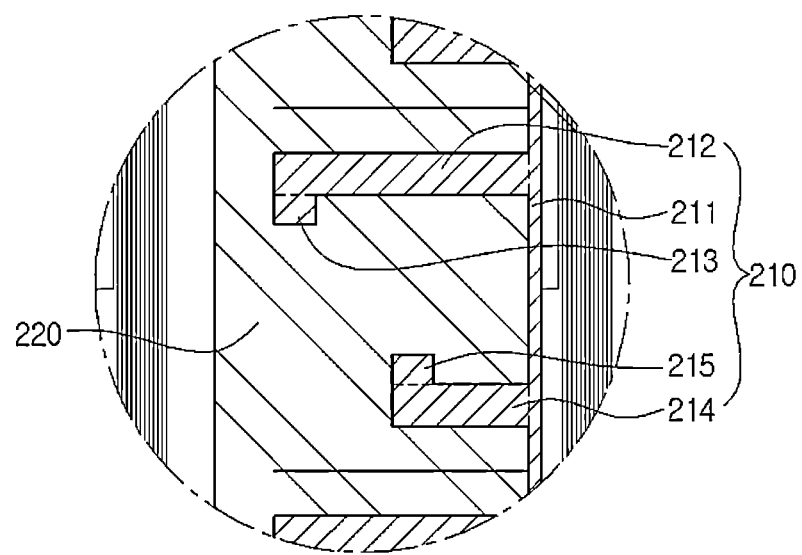
FIG. 4 is an enlarged view illustrating a region 'A' of FIG. 1.
Figure 5:
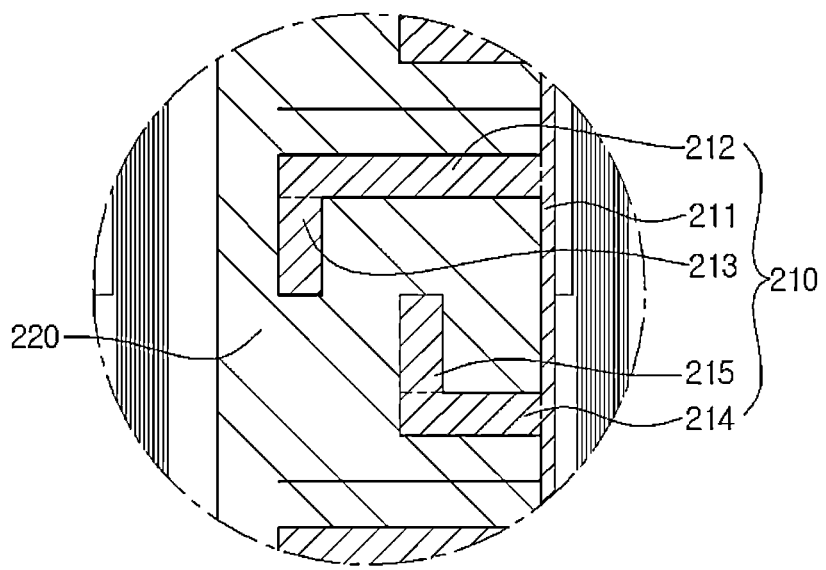
FIG. 5 is an enlarged view illustrating a region 'B' of FIG. 1.
Figure 6:
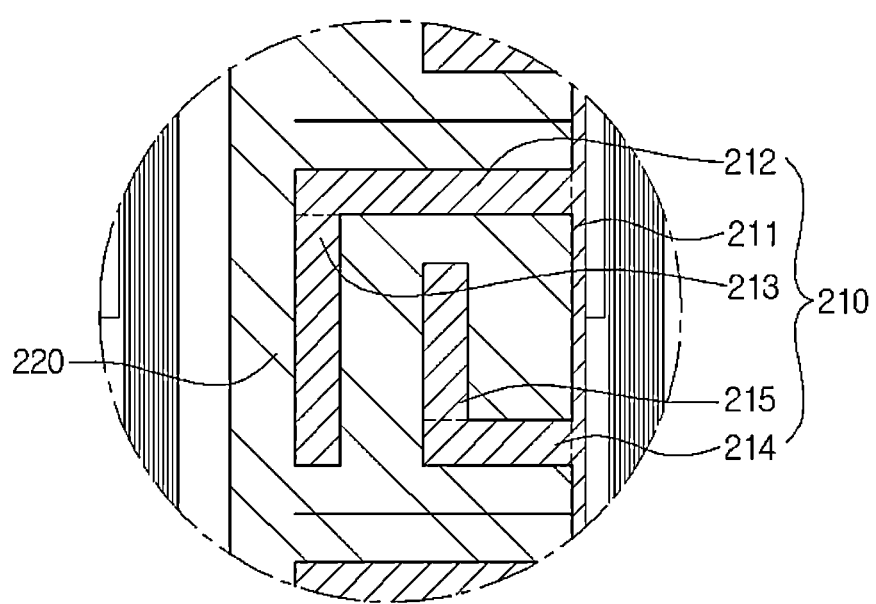
FIG. 6 is an enlarged view illustrating a region 'C' of FIG. 1.

Meanwhile, although the embodiment of FIGS. 4 to 6 has illustrated that a wire electrode is drawn upward from the cover window 100, the embodiment is not limited thereto. When the bonding part is disposed at a lower end of the cover window 100 due to structural reasons, the wire electrode may be drawn toward a bottom end of the cover window 100.

Hereinafter, the sensing electrode according to the embodiment will be described with reference to FIGS. 2 and 3.

Figure 2:
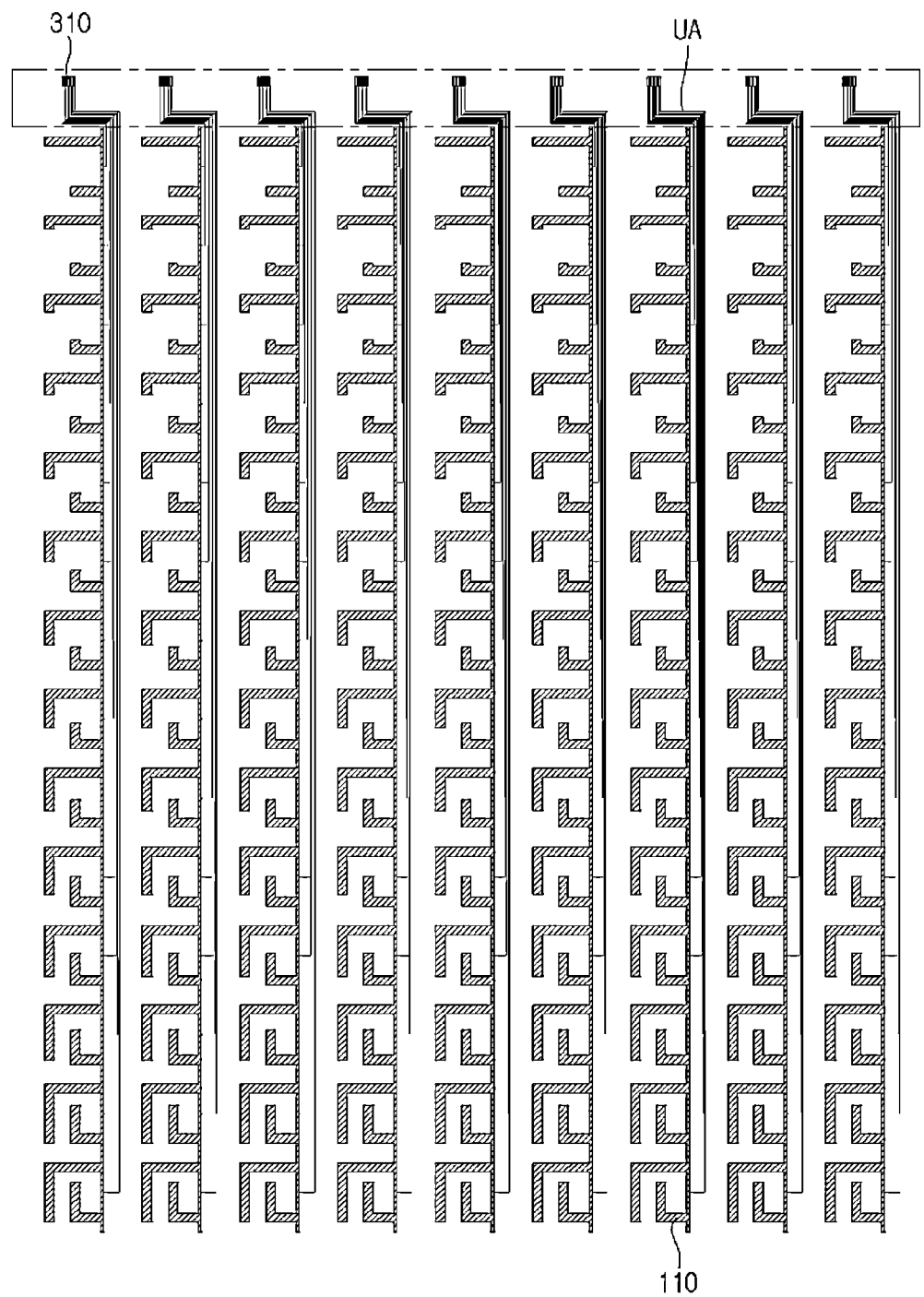
FIG. 2 is a view illustrating a first sensing electrode pattern of a touch panel according to an embodiment.

Referring to FIG. 2, the first sensing electrode 210 may extend upward and downward from the cover window 100 on the active area AA. Further, the first sensing electrode 210 may be disposed while forming a first sensing electrode pattern.

The first sensing electrode pattern may be changed according to a location of the first sensing electrode. That is, the first sensing electrode does not include the same pattern in the active area of the cover window, but may include different patterns according to a location in the active area AA.

Referring to FIGS. 4 to 6, the first sensing electrode pattern may include a plurality of sub-electrodes. In detail, the first sensing electrode pattern may include a first sub-electrode 211, a second sub-electrode 212, a third sub-electrode 213, a fourth sub-electrode 214, and a fifth sub-electrode 215.

In more detail, the first sensing electrode pattern may include the first sub-electrode 211 and the second sub-electrode 212 extending in the first direction of the cover window 100 from the first sub-electrode 211. Further, the first sensing electrode pattern may further include the third sub-electrode 213 bent from the second sub-electrode 212 and extending in the second direction different from the first direction. Further, the first sensing electrode pattern may include the fourth sub-electrode 214 extending in the first direction of the cover window 100 from the first sub-electrode 211, and the fifth sub-electrode 215 bent from the fourth sub-electrode 214 and extending in the third direction different from the first direction. The first sub-electrode 211, the second sub-electrode 212, the third sub-electrode 213, the fourth sub-electrode 214, and the fifth sub-electrode 215 may be formed integrally with each other without separation.

Further, the second sub-electrode and the fourth sub-electrode 214 may extend in the same direction. In addition, the fourth sub-electrode 214 may formed toward the bottom end of the cover window 100 with respect to the second sub-electrode 212. That is, a distance between the second sub-electrode 212 and the bonding part may be smaller than a distance between the fourth sub-electrode 214 and the bonding part.

Further, the second direction and the third direction may extend in opposition to each other. For example, when the second direction extends toward the top end of the cover window 100, the third direction may extend toward the bottom end of the cover window 100. When the second direction extends toward the bottom end of the cover window 100, the third direction may extend toward the top end of the cover window 100.

The first sensing electrode patterns having mutually different shapes are formed on the active area AA.

Referring to FIG. 2, an end of the first sensing electrode pattern is arranged at a top end or a bottom end of the cover window 100. A wire electrode connected to the first sensing electrode is located at the top end or the bottom end of the cover window through the active area AA.

That is, the first sensing electrode is configured such that an end of the sensing electrode pattern is arranged toward a top end or a bottom end of the active area AA, and the wire electrode is connected to the end of the sensing electrode pattern. In this case, as shown in FIG. 2, the wire electrode 200 may be arranged at the top end or the bottom end of the active area AA. That is, the wire electrode may be formed at the top end or the bottom end of the active area of the cover window according to the location of a printed circuit board of the touch panel.

In other words, when the printed circuit board is arranged at the top end of the active area AA of the cover window, the wire electrode may be arranged at the top end of the active area AA. In addition, when the printed circuit board is formed at the bottom end of the active area of the cover window, the wire electrode may be arranged at the bottom end of the active area.

In this case, the first sensing electrode pattern may be changed according to the wire electrode, that is, a distance between the first sensing electrode pattern and a bonding part at which the wire electrode is connected with the printed circuit board. That is, as shown in FIG. 2, as the third sub-electrode and the fifth sub-electrode of the first sensing electrode pattern is located away from the bonding part, the third sub-electrode and the fifth sub-electrode have mutually different shapes, that is, mutually different lengths.

In detail, as the third sub-electrode extends in a row direction, the length of the third sub-electrode may vary. Further, as the fifth sub-electrode extends in the row direction, the length of the fifth sub-electrode may vary.

That is, referring to FIG. 2, as the first sensing electrode pattern is located away from the bonding part, lengths of the third sub-electrode 213 and the fifth sub-electrode 215 of the first sensing electrode pattern may be increased.

Accordingly, as the first sensing electrode pattern is located away from the bonding part, lengths of the third sub-electrode 213 and the fifth sub-electrode 215 are increased. Thus, the first sensing electrode pattern of the sensing electrode aligned in upward and downward directions of the cover window located away from the bonding part in the active area may have mutually different patterns, and the first sensing electrode pattern aligned in left and right directions of the cover window may have the same pattern.

Figure 3:
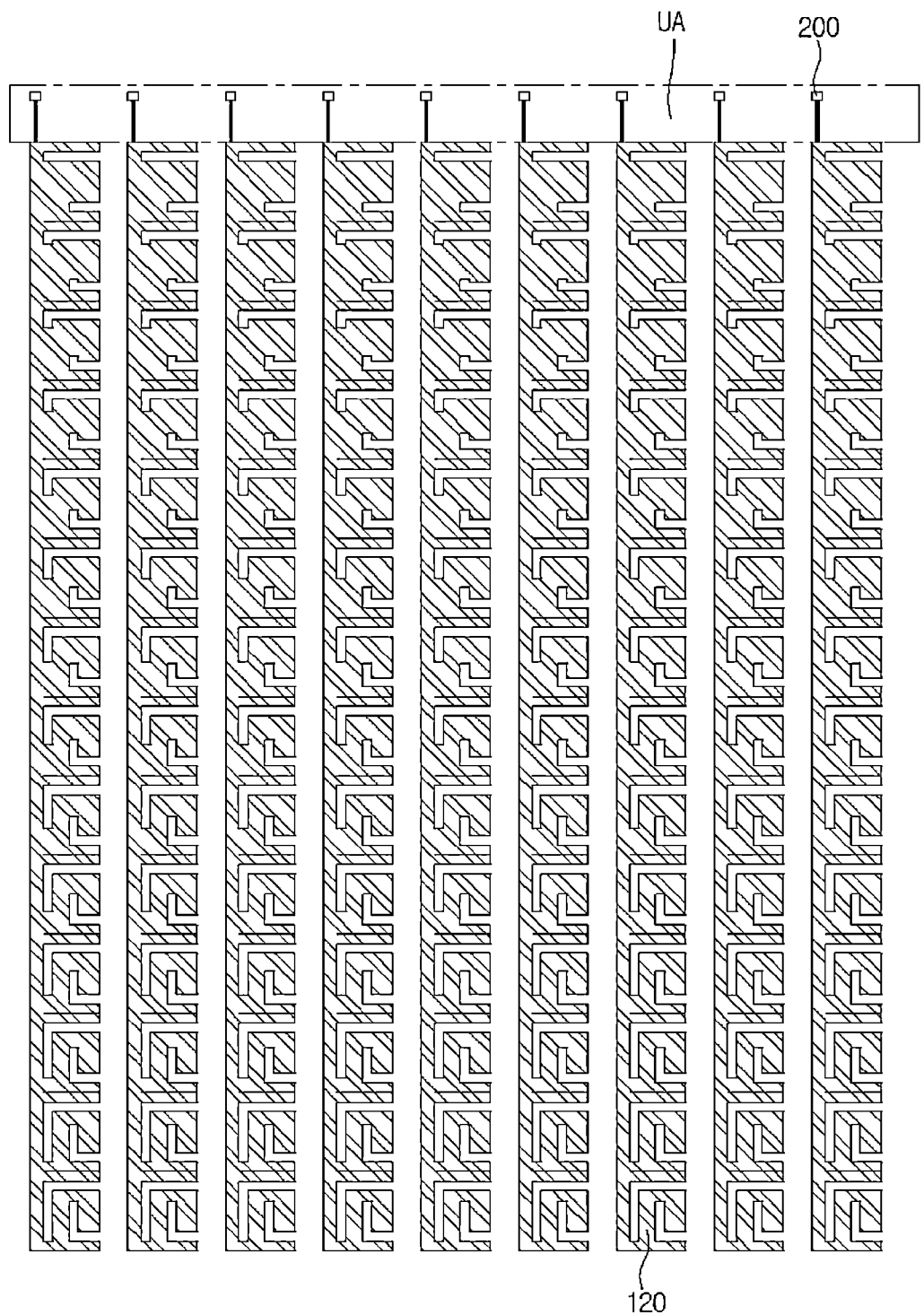
FIG. 3 is a view illustrating a second sensing electrode pattern of a touch panel according to an embodiment.

Referring to FIG. 3, the second sensing electrode is formed in the active area of the cover window. Further, the second sensing electrode forms a second sensing electrode pattern. A pattern may be formed in the second sensing electrode in the same manner of the above first sensing electrode.

The second sensing electrode pattern may vary depending on a location of the second sensing electrode. That is, the second sensing electrode may not have the same pattern in the active area of the cover window, but may have mutually different patterns according to a location in the active area AA.

The second sensing electrode pattern may have a complementary shape to that of the first sensing electrode pattern. In detail, the second sensing electrode pattern may be changed according to a shape of the first sensing electrode pattern.

That is, the first sensing electrode pattern is aligned on the same plane in the cover window with the second sensing electrode pattern. A unit pattern of the first sensing electrode pattern is coupled with a unit pattern of the second sensing electrode pattern to form one node. That is, the node is formed by coupling the first sensing electrode pattern with the second sensing electrode pattern having a complementary shape to the first sensing electrode pattern. In this case, the node may have a square shape.

Accordingly, when the first sensing electrode pattern forms a predetermined pattern in the square node, the second sensing electrode pattern may have a complementary shape to the first sensing electrode pattern in the squire node, that is, a male-female combination pattern. That is, the first sensing electrode pattern may be formed close to the second sensing electrode pattern, and the first sensing electrode pattern may be coupled with the second sensing electrode pattern to be defined as a node having a square shape.

The first sensing electrode pattern and the second sensing electrode pattern are spaced apart from each other by a predetermined distance without making contact with each other and are aligned on the same plane of the cover window 100. For example, the first sensing electrode pattern may be spaced apart from the second sensing electrode pattern by a distance in the range of about 10 µm to about 30 µm.

Accordingly, since the first sensing electrode pattern is changed as the first sensing electrode pattern is located away from the wire electrode, the second sensing electrode pattern is complementarily changed according to the change of the first sensing electrode pattern to make the node having the square shape.

That is, a shape of the second sensing electrode pattern is changed corresponding to the change of the first sensing electrode pattern. That is, the shape of the second sensing electrode pattern is changed as the second sensing electrode pattern is located away from the bonding part at which the wire electrode is connected with the printed circuit board. Further, in the same manner as the first sensing electrode pattern, the second sensing electrode patterns extending in upward and downward directions of the cover window have mutually different shapes, and the second sensing electrode patterns extending in left and right directions of the cover window have the same shape.

Referring to FIG. 1 and FIGS. 4 to 6, in the touch panel according to the embodiment, patterns of sensing electrodes located on the active area of the cover window extend in one direction to have mutually different shapes.

That is, the first sensing electrode pattern and the second sensing electrode pattern extend upward and downward from the cover window to have mutually different shapes. In detail, the first sensing electrode pattern and the second sensing electrode pattern are constantly changed as the first sensing electrode pattern and the second sensing electrode pattern are located away from the bonding part.

Referring to FIGS. 4 to 6, as the sensing electrode is located away from the bonding part disposed at a top end of the cover window, patterns of the sensing electrodes are changed.

FIGS. 4 to 6 illustrate a unit pattern of the first sensing electrode pattern and a unit pattern of the second sensing electrode pattern, which are aligned on the same plane of the cover window to form one node. As the first sensing electrode pattern and the second sensing electrode pattern are located away from the bonding part, lengths of sub-electrodes in the first sensing electrode pattern and the second sensing electrode pattern are changed.

That is, referring to the first sensing electrode pattern, the first sensing electrode pattern extends in the first direction so that lengths of the third sub-electrode and the fifth sub-electrode of the first sensing electrode pattern become different from each other. In detail, as the first sensing electrode pattern is located away from the bonding part, the lengths of the third sub-electrode and the fifth sub-electrode are increased.

That is, as the first sensing electrode pattern is located away from the bonding part, the third sub-electrode 213 of the first sensing electrode pattern is further lengthened toward a bottom end of the cover window 100, and the fifth sub-electrode 215 is further lengthened toward a top end of the cover window 100.

Accordingly, the first sensing electrode pattern extends from the bonding part disposed at a top end of the cover window to a bottom end of the cover window 100 so that a total length of the first sensing electrode pattern may be increased. In detail, the first sensing electrode pattern extends to the bottom end of the cover window so that a coupling region in which the first sensing electrode pattern is close to the second sensing electrode pattern is increased. In other words, the first sensing electrode pattern extends to the bottom end of the cover window so that a current value of the first sensing electrode pattern is constantly increased.

Accordingly, the touch panel according to the embodiment may uniformly maintain sensitivities of the sensing electrodes aligned on the active area under the influence of resistance of the wire electrode.

That is, according to the touch panel of the embodiment, as the left and right bezels are removed, the wire electrode connected to the first sensing electrode extends from the active area to the top end or the bottom end of the cover window.

Accordingly, the wire electrode connected to the first sensing electrode is drawn toward the top end or the bottom end of the touch panel in the active area. That is, instead of the wire electrode including a metallic material according to the related art formed at left and right bezels of the touch panel, the wire electrode including at least one selected from the group consisting of indium tin oxide (ITO), indium zinc oxide (IZO), carbon nano tube (CNT), and Ag nano wire may be arranged in the active area.

The wire electrode including the conductive material has surface resistance higher than that of the metal wire electrode. Accordingly, since the resistance of the wire electrode is increased as the wire electrode is located away from the bottom end of the touch panel, that is, the bonding part, a current generated from the sensing electrodes located away from the bonding part may be reduced due to the influence of the wire electrode, which may cause the non-uniform sensitivity of the sensing electrode in the active area.

Accordingly, in the touch panel according to the embodiment, the pattern of the sensing electrode varies in a direction away from the bonding part so that non-uniform generation of the current, that is, non-uniform sensitivity can be solved. That is, as the first sensing electrode pattern and the second sensing electrode pattern are located away the bonding part formed at the top end of the touch panel, a coupling region between the first sensing electrode pattern and the second electrode pattern is increased. Accordingly, as the first sensing electrode pattern and the second sensing electrode pattern are located away the bonding part, a current amount of the first sensing electrode pattern may be increased. Thus, since an influence due to resistance, which is increased as the first sensing electrode pattern is located away from the bonding part, that is, as a length of the wire electrode is increased, may be attenuated due to the increase of the current amount, the influence caused by the wire electrode can be reduced. Therefore, the touch panel according to the embodiment may maintain a uniform current value, that is, uniform sensitivity in the active area.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
    a cover window in which an active area and an inactive area are defined;
    a sensing electrode in the active area;
    a wire electrode connected to the sensing electrode;
    a printed circuit board in the inactive area; and
    a bonding part connecting the wire electrode with the printed circuit board;
    wherein the sensing electrode comprises a plurality of first sensing electrodes in the active area and a plurality of second sensing electrodes aligned on a same plane with the plurality of first sensing electrodes in the active area,
    wherein the plurality of first sensing electrodes is respectively coupled with the plurality of second sensing electrodes,
    wherein sizes of coupling areas between the plurality of first sensing electrodes and the plurality of second sensing electrodes are gradually increased when the plurality of first sensing electrodes and the plurality of second sensing electrodes are located away from the bonding part,
    wherein the plurality of first sensing electrodes forms a first sensing electrode pattern, and
    wherein when a first sensing electrode of the first sensing electrode pattern is further spaced apart from the bonding part, a length of the first sensing electrode of the first sensing pattern is increased.

2. The touch panel of claim 1, wherein
    the plurality of second sensing electrodes forms a second sensing electrode pattern, and
    the first sensing electrode pattern and the second sensing electrode pattern have mutually different shapes.

3. The touch panel of claim 2, wherein the first sensing electrode pattern comprises:
    a first sub-electrode; and
    a second sub-electrode extending from the first sub-electrode in a first direction of the cover window.

4. The touch panel of claim 3, further comprising a third sub-electrode bent from the second sub-electrode and extending in a second direction different from the first direction.

5. The touch panel of claim 3, further comprising:
    a fourth sub-electrode extending from the first sub-electrode in the first direction of the cover window; and
    a fifth sub-electrode bent from the fourth sub-electrode and extending in a third direction different from the first direction.

6. The touch panel of claim 4, further comprising:
    a fourth sub-electrode extending from the first sub-electrode in the first direction of the cover window; and
    a fifth sub-electrode bent from the fourth sub-electrode and extending in a third direction different from the first direction.

7. The touch panel of claim 4, wherein a length of the third-sub electrode is increased as the third-sub electrode is located away from the bonding part.

8. The touch panel of claim 6, wherein a length of the fifth-sub electrode is increased as the fifth-sub electrode is located away from the bonding part.

9. The touch panel of claim 6, wherein the second direction and the third direction extend in opposition to each other.

10. The touch panel of claim 9, wherein the second sensing electrode pattern has a shape complementary to a shape of the first sensing electrode pattern.

11. The touch panel of claim 10, wherein the first sensing electrode pattern is spaced apart from the second sensing electrode pattern by a distance in a range of 10 μM to 30 μM.

12. The touch panel of claim 1, wherein the sensing electrode and the wire electrode comprise a same material.

13. The touch panel of claim 12, wherein the sensing electrode and the wire electrode comprise at least one selected from the group consisting of indium tin oxide (ITO), indium zinc oxide (IZO), carbon nano tube (CNT), and Ag nano wire.

14. The touch panel of claim 1, wherein the wire electrode is disposed in both the active area and the inactive area.

15. The touch panel of claim 14, wherein the wire electrode is drawn toward a top end or a bottom end of the cover window.

* * * * *